Nov. 23, 1965 K. C. LOGAN ETAL 3,219,076
WOOD CHIP PRODUCING DEVICE
Filed Feb. 15, 1963 4 Sheets-Sheet 1
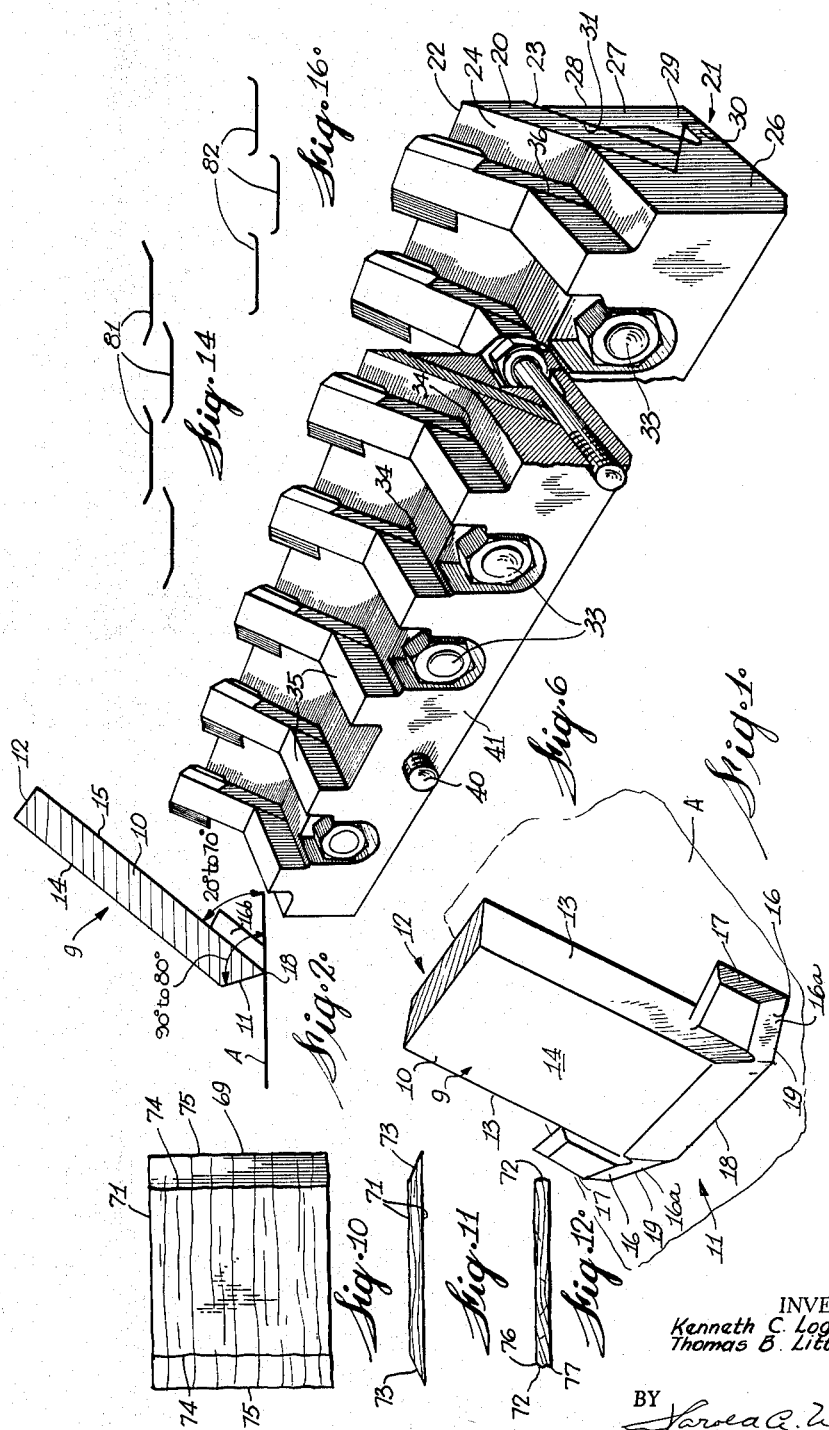
INVENTOR
Kenneth C. Logan
Thomas B. Little
BY
ATTORNEY

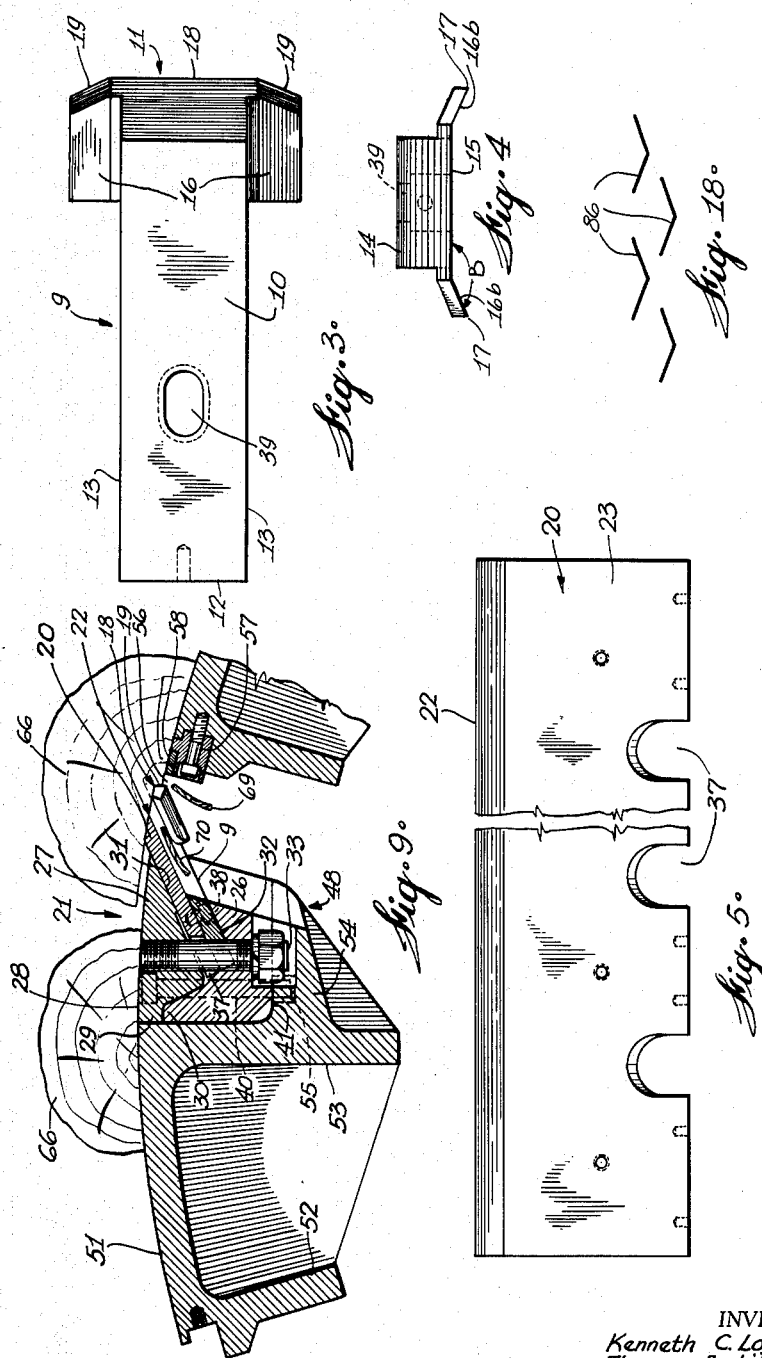

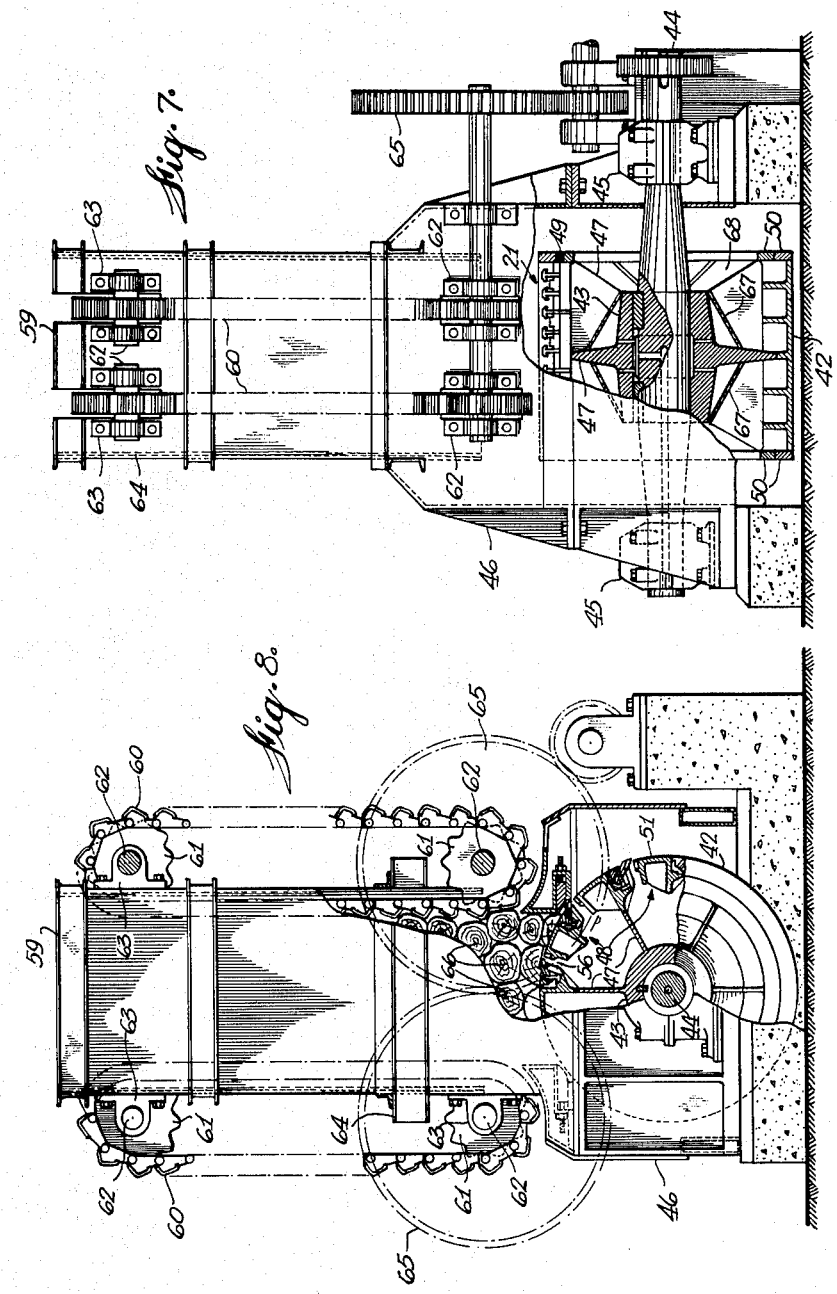

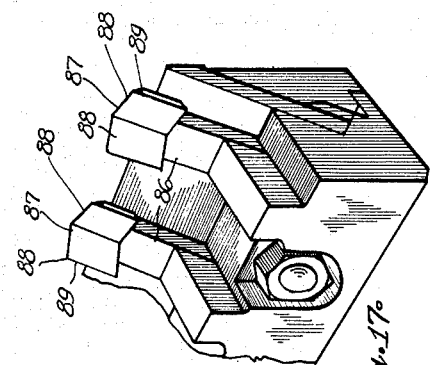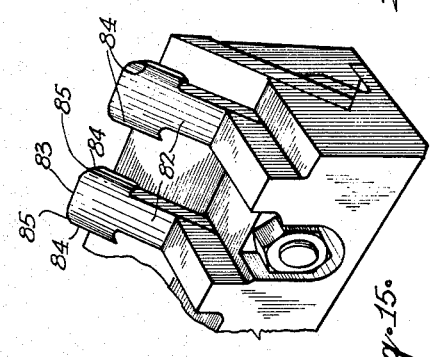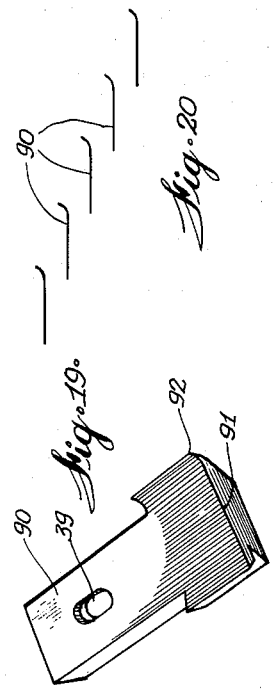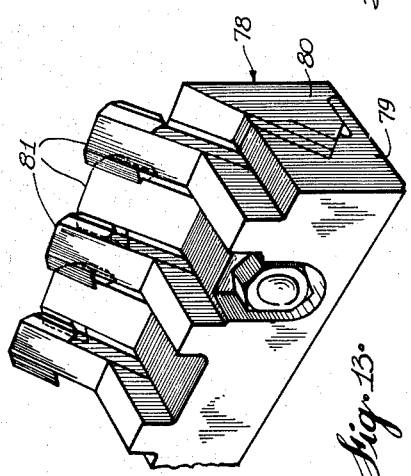

3,219,076
WOOD CHIP PRODUCING DEVICE
Kenneth C. Logan and Thomas B. Little, Quebec, Quebec, Canada, assignors to Anglo Paper Products, Limited, Quebec, Quebec, Canada
Filed Feb. 15, 1963, Ser. No. 258,706
4 Claims. (Cl. 144—42)

This invention relates to an apparatus for forming wood chips for pulping, particle board production, and the like. This application is a continuation-in-part of application Serial No. 777,494, filed December 1, 1958 (now abandoned).

It has long been recognized that the conventional wood chipper as employed for the production of chips used in the manufacture of pulp damages the wood fibers and thus results in lowered pulp quality. This is due to the fact that the standard chipping operation crushes or compresses the wood fibers when severing a chip angularly of the grain direction. The situation was discussed at length in an article entitled "The Effect of Chipping on the Suitability of Wood for Sulphite Pulping" by H. Green and F. H. Yorston, which appeared in Pulp and Paper Magazine of Canada, Convention Issue, 1940. This article suggests that undamaged chips may be prepared by sawing up logs into discs of chip length and, subsequently, splitting up the discs with a knife. However, the operation of sawing up logs into discs produces large quantities of sawdust, which is undesirable for economic reasons and such an operation is extremely extravagant of labor and equipment.

Despite widespread recogniztion of the fact that chips of improved characteristics would result in a much superior type of pulp, no commercially acceptable or practical manner of forming such chips appears to have been heretofore proposed.

A general object of this invention is to provide a device which may be employed to form, in a convenient, practical and economical manner, chips of improved characteristics.

Another object is to provide a chip-forming tool having at least two cutting edge portions arranged in such relation to each other that such cutting edge portions may be applied to a wood body to sever therefrom a chip of improved characteristics.

Another object is to provide a knife assembly, incorporating the tool of the present invention, which may be employed to utilize in a convenient and practical manner, such chip-forming tool.

Another object is to provide a drum type of mount for such knife assembly, said mount being adapted to support the knife assembly in cutting position and being operable to produce chip forming movement of said knife assembly.

Other objects, details and advantages of the invention will become apparent from the ensuing description, with particular reference to the accompanying drawings, in which FIGURE 1 is a perspective view of a chip-forming tool in accordance with the invention,
FIGURE 2 is a side elevation of the tool,
FIGURE 3 is a plan view of the tool,
FIGURE 4 is an end elevation of the tool,
FIGURE 5 is a plan view of a slabbing knife which may be employed in association with the chip-forming tool,
FIGURE 6 is a perspective view of a knife assembly,
FIGURE 7 is a side elevation, partly in section, of a machine incorporating the present invention,
FIGURE 8 is an end elevation, partly in section, of the machine shown in FIGURE 7,
FIGURE 9 is an enlarged sectional end elevation of the knife assembly in association with the mounting drum,
FIGURE 10 is a plan view of a chip produced in accordance with the invention,
FIGURE 11 is a side elevation of the chip shown in FIGURE 10,
FIGURE 12 is an end elevation of the chip shown in FIGURE 10,
FIGURE 13 is a partial perspective view of a knife assembly having a modified form of tool arrangement,
FIGURE 14 is a bottom profile of the tools shown in FIGURE 13 when cutting tangentially to a log,
FIGURE 15 is a partial perspective view of a knife assembly having another modified form of tool,
FIGURE 16 is a bottom profile of a modified arrangement of the tools shown in FIGURE 15,
FIGURE 17 is a partial perspective view of a knife assembly having still another modified form of tool,
FIGURE 18 is a bottom profile of a modified arrangement of the tools shown in FIGURE 17,
FIGURE 19 is a perspective view of another modified form of chip-forming tool, and
FIGURE 20 is a bottom profile of an arrangement of the tools shown in FIGURE 19.

Referring to FIGURES 1 to 4, the chip-forming tool 9 illustrated comprises a body portion 10 which, as shown is of rectangular plate-like form and has a forward end 11, a rearward end 12, sides 13 joining said ends, a top face 14 and a bottom face 15. A wing portion 16 extends laterally outwardly from each side 13 adjacent the forward end. Each wing portion 16 has a side edge 17 which is disposed in a plane spaced outwardly from the plane of bottom face 15.

The body portion has a transversely extending cutting edge 18 on the forward end, such cutting edge 18 being formed by bevel grinding the forward end 11 to a sharpened edge substantially coincident with the plane of the bottom face 15. The top face 14 lies in a plane parallel to the plane of the bottom face 15. In the modification shown, cutting edge 18 is at right angles to the longitudinal axis of the body portion.

Each wing portion 16 has a cutting edge 19, also formed by bevel grinding the forward end 16a thereof, such cutting edge 19 extending angularly and rearwardly from cutting edge 18 to the plane of side edge 17. Cutting edge 19 is coincident with the bottom face 16b of the wing portion.

Cutting edge 18 is of substantially greater length than each of the cutting edges 19. Preferably, cutting edge 18 is at least twice the length of each cutting edge 19.

Since each cutting edge 19 extends from an end of cutting edge 18, these cutting edges may be regarded as a single cutting edge of continuous extent from end to end thereof but having portions angularly disposed with respect to each other. It is thus apparent that the cutting edges 18 and 19 are disposed in a common plane which is indicated in FIGURES 1 and 2 at A.

The included angle between cutting edge 18 and each cutting edge 19 is 175° to 95° with a preferred range of 165° to 135°, depending to some extent upon the thickness of the chip desired. This angle is indicated at B in FIGURE 4.

Bottom face 15 and bottom face 16b are each disposed at an angle of 20° to 70° to plane A. Preferably, this angle is in the range 30° to 60°.

End face 11 and end face 16a (forming cutting edges 18 and 19 with faces 15 and 16b respectively) are each disposed at an angle of 100° to 70° to plane A. Preferably, this angle is in the range 90° to 80°.

FIGURE 5 illustrates a slabbing knife 20 which may be employed to produce chips in association with the chip-forming tools 9 by, for instance, mounting these elements in a knife assembly as indicated at 21 in FIGURE 6.

The knife 20 comprises, as shown, an elongated flat metal plate having one of its longitudinal edges sharpened to form a cutting edge 22. Knife 20 has a plane top face 23, a plane bottom face 24, and a plane end face 25 terminating at bottom face 24 and defining therewith cutting edge 22.

The knife assembly illustrated in FIGURE 6 comprises a pair of elongated knife holding or clamping members 26 and 27. Member 27 has a smooth outer surface 28 and a shoulder 29 extending along one longitudinal edge thereof for engagement with a complementary shoulder 30 on the adjacent edge of member 26. Member 27 has an inclined inner surface 31 in spaced parallel relation to an inclined surface 32 on member 26. The members 26 and 27 are adapted to be clamped together by means of a plurality of bolts 33.

A plurality of chip-forming tools 9 and a slabbing knife 20 are arranged to be clamped between the inclined surfaces 31 and 32 of members 26 and 27. Member 26 has a series of spaced grooves 34 in its surface 32, each such groove receiving the rearward end section of a tool 9. Member 26 may also be provided with a series of reinforcing ribs 35 each having a surface 36 engaging the bottom face 15 of a tool 9. Slabbing knife 20 has its bottom face 24 in engagement with the top faces 14 of the series of tools 9 and its top face 23 in engagement with surface 31 of member 27. Knife 20 has its inner edge notched at 37 to receive the bolts 33.

Each tool 9 is further retained in position with respect to knife 20 by suitable means such as a socket head screw 38 which extends through a slot 39 in the tool.

It will be apparent that when the holder members 26 and 27 are clamped together by means of the bolts 33, with assembled knife and tools therebetween, the latter will be securely clamped in the holder.

Means for securing the assembly in a mounting device comprises a plurality of bolts 40 extending through the members 26 and 27 and having their ends projecting through a surface 41 of member 26 which is disposed in substantially opposed relation to surface 28 of member 27.

Referring to FIGURES 7, 8, and 9, a machine is disclosed therein for utilizing knife assemblies as described in the production of chips in accordance with the invention.

A plurality of knife assemblies 21 are mounted in a frame which, in the form illustrated, comprises a drum 42. The drum 42 has a hub 43 mounted on a shaft 44 which is driven in any suitable manner. The shaft is journalled in bearings 45 mounted in a main frame 46. A plurality of spider arms 47 extend radially outwardly from the hub.

The drum has a plurality of knife assembly supports 48 mounted in any suitable manner as by end lugs 49 carried by end rings 50 fixedly mounted in the ends of the drum. Each support 48 has an outer arcuate surface 51 and radially inwardly extending portions 52 and 53. The inner edge of portion 53 of each alternate support is seated on the outer edge of an arm 47.

Each support 48 has an inwardly recessed shoulder 54 upon which a knife assembly 21 is seated, surface 41 thereof being in engagement with the shoulder and opposed surface 28 thereof constituting a continuation of surface 51. It will be apparent that surface 28 should preferably be of arcuate contour. Knife assembly 21 is secured in position by screwing bolts 40 into screw-threaded sockets 55 in shoulder 54.

It will be appreciated that surfaces 28 and 51 constitute the cylindrical surface of the drum. As clearly shown in FIGURE 9, cutting edges 18, 19 and 22 are located radially outwardly of this cylindrical surface. In each assembly, cutting edges 18 and 19 of the tools 9 are in leading relation to the cutting edge 22 of knife 20. Cutting edge 18 is in very slightly outwardly spaced relation (of the order of 0.010 inch) with respect to cutting edge 22.

With each knife assembly clamped in the holder, and the holder seated in the drum, as described, the cutting edges 22 and 18 and the leading ends of cutting edges 19 are disposed outwardly of the arcuate surface 28, a distance approximately equal to the desired thickness of the chip, However, this distance is desirably 0.001 to 0.500 inch. As clearly shown in FIGURE 9, a chip-receiving space 56 is provided between each adjacent pair of holders directly below the knife assembly. An anvil member 57 having an anvil 58 is mounted in each support 48, the anvil 58 being disposed slightly forwardly of the cutting edges 18 and 19.

The distance between the cutting edges 19 on each tool 9 and the space between each cutting edge 19 and the cutting edge 19 of the adjacent tool 9 is dependent upon the desired width of chip. However, a satisfactory spacing between the cutting edges 19 on each tool 9 is two and one-half inches with the tools 9 spaced on four inch centers.

The length of each knife holder and knife assembly is approximately equal to the length of the logs from which the chips are to be produced.

Means for feeding logs onto the top of the revolving drum for engagement by the moving knife assemblies thereon comprises a feed hopper 59, the sides of which are constituted by a pair of travelling chains 60. Each chain 60 is carried by vertically aligned sprockets 61 mounted on shafts 62. Shafts 62 are supported in bearings 63 mounted in frame 64. The lower sprockets of each pair are driven by gears 65 in opposite directions. Thus, the inner travelling portions of the chains move downwardly to feed logs 66 downwardly onto the drum. It will be observed that the logs 66 are disposed with their axes parallel to the axis of the drum.

A conical baffle 67 on each end of the drum hub 43 directs chips from the chip-receiving spaces 56 outwardly through opening 68 in the ends of the drum, where they may be collected in any suitable manner.

In operation, with the drum revolving and the logs being fed onto the same in the manner described, initial contact with the side surface of a log is by the cutting edges 18 and 19 of tools 9. It will be apparent that the cutting edges 19 will engage the log very slightly in advance of cutting edges 18. Actually, it has been determined that in the structure described, cutting edges 19 will engage the log about $\frac{1}{100}$ of a second or less in advance of cutting edges 18 and thus, for practical purposes, the initial engagement of such cutting edges may be regarded as simultaneous. The cutting edges 19 may engage the log approximately one-quater to two inches in advance of cutting edges 18.

It will be apparent that the cutting edges 19 will produce grooves in the log surface extending angularly to the grain direction in the log. It will be apparent that each cutting edge 19 is in a plane which is at an agle to the tangent of the log being cut. This angle, as shown, in the order of 25°. Thus, as it passes through the log, there is substantially no end grain thrust against the wood left on the outside of the cutting edge. The wood on the inside of the cutting edges, i.e., the wood between the cutting edges 19 of each tool 9, begins to be compressed, but since the relatively thin chip is simultaneously freed from the log in the grain direction by the cutting edge 18 (which is parallel to the log axis and the grain) the chip, as indicated at 69, is free to bend either parallel to the grain or has its tip twisted up by the knife member. As the chip bends parallel to the grain it fits into the channel between cutting edges 19. The included angle of this channel, between the bottom (the face of the tool 9 between the cutting edges 19) and the sides (the opposite faces of the cutting edges 19), is substantially equal or greater than the angle between the parallel plane face of the chip and its end grain cuts. Thus, there can be little or no compression of the wood in the chip.

It will be apparent that the tools 9 will, in the production of chips thereby, leave a plurality of spaced grooves in the surface of the log with intervening "land" areas. These "land" areas are engaged by the following cutting edge 22 of knife 20, such edge 22 also being disposed parallel to the grain direction in the wood. Cutting edge 22 will engage the land areas at approximately the base of cuts produced by cutting edges 19 and not lower since the plane of the cutting edge 22 is very slightly lower than the plane of cutting edges 19, i.e., to a degree sufficient to ensure a "clean" cut between the edges of each land area. It will be observed that such edges are parallel and since no endwise compression is imposed thereon, no endwise or cross grain compression is exerted on the resulting chip produced as indicated at 70.

In the production of chips as described, any endwise compression exerted on the chip during its formation is not substantially greater than 0.060 inch per inch of free chip length and preferably not greater than 0.040 inch per inch of free chip length.

The chip 69 produced is shown in FIGURES 10, 11 and 12. It has two substantially parallel major faces 71 which, as previously indicated, are approximately 0.001 to 0.500 inch apart; two faces 72 broken randomly with the grain direction (one or both of these faces might be the outer surface of the log); and two other regular faces 73, the four corners of which are generally straight and parallel. As shown, each face 73 is inclined at an angle of approximately 25° to a face 71. However, as previously indicated, the relation of this face to the other faces of the chip will depend upon the geometry of the particular tool 9 employed. It will also be apparent that the general description of chip 70 will be the same as that of chip 69. The faces of chip 70 corresponding to the faces 73 of chip 69 will, however, be disposed at substantially right angles to the major faces thereof. Thus, the chip produced has four corners 74 and 75 which are parallel to each other and four corners 76 and 77 which are random with the grain. Thus, the wood of the logs has been subdivided into chip form regular in two dimensions without causing substantial damage by end compression of the wood.

Referring to FIGURES 13 and 14, a knife assembly 78 is therein illustrated which may be employed as an alternative to that illustrated in FIGURE 6. Assembly 78 includes clamping members 79 and 80 corresponding to members 26 and 27 as well as a series of tools 81 similar to tools 9. However, instead of the slabbing knife 20, a second series of tools 81 is mounted between the clamps, the members of such second series being disposed opposite the spaces between the members of the first series. By particular reference to FIGURE 14, it will be apparent that the first series of members 81 will produce chips while leaving land areas between the resulting gouges in the log face, and that the second series of members 81 will remove such land areas also to provide chips.

FIGURE 15 illustrates a tool 82 which may be employed alternatively to tools 9 or 81. Tool 82 has a main cutting edge 83 and a pair of cutting edges 84 extending angularly to cutting edge 83. However, each cutting edge 84 has a curved corner 85. FIGURE 16 illustrates diagrammatically a manner of mounting two series of tools 82 in a manner similar to the modification of FIGURES 13 and 14.

FIGURE 17 illustrates still another knife member or tool 86 which may be employed alternatively to tools 9 or 81. Tool 86 has a main cutting edge 87 comprising two straight sections 88 obliquely inclined with respect to each other, as well as a pair of cutting edges 89 constituting the end portions of cutting edge 87. It will be apparent that the chip produced by such a knife member will be of flattened triangular cross-section. FIGURE 18 shows diagrammatically a suitable arrangement of two series of such members 86.

FIGURE 19 shows a modified knife member or tool 90 having a main cutting edge 91 and a single cutting edge 92 extending angularly thereto. It will be observed that, with tools 90 arranged in slightly overlapping series as shown in FIGURE 20, the cutting edges 92 of adjacent knife members will perform the cross grain slits in the log surface and the intervening cutting edge 91 of one tool 90 will perform the "slabbing" operation.

We claim:

1. A chip-forming tool for producing wood chips comprising a body having a forward end face, a rearward end, a top face, and a bottom face, said forward end face having a line of juncture with said bottom face constituting a cutting edge, said cutting edge being continuous from end to end thereof and disposed substantially in a single plane and having an intermediate straight portion and straight end portions each extending from said intermediate portion in angular and rearward relation thereto, the included angle between each of said end portions and said intermediate portion being 165° to 135°, said bottom face being disposed at an angle of 30° to 60° to said plane on the rearward side of said cutting edge portions toward which said rearward angular portions extend, and said forward end face being disposed at an angle of 100° to 70° to said plane on said one side of said cutting edge portions.

2. A chip-forming tool as defined in claim 1, said intermediate cutting edge portion being at least twice the length of each of said end cutting edge portions.

3. Apparatus for producing substantially undamaged wood chips which comprises a rotatably mounted drum having a work performing direction of movement, a plurality of spaced chip forming tools mounted on said drum, each said chip forming tool comprising a body portion having a forward end, a rearward end, sides joining said forward and rearward ends and lying between upper and lower planes, a top face disposed in said upper plane, and a bottom face disposed in said lower plane, and at least one wing portion extending laterally outwardly from one of said sides adjacent said forward end and having a side edge disposed in a plane parallel to and spaced outwardly from said lower plane, said body portion having a cutting edge disposed in said lower plane on said forward end extending transversely of said direction of movement and spaced radially outwardly from the surface of said drum for work engagement, said wing portion having a cutting edge extending angularly from said body portion cutting edge to said side edge plane, said angular cutting edge extending radially outwardly from the surface of said drum for work engagement, and a knife member mounted on said drum and having a cutting edge in trailing relation to said chip forming tool cutting edges and spanning each of the spaces between said chip forming tools, said drum having a series of chip-receiving passages extending therethrough and each having a mouth disposed on the surface of said drum immediately in advance of said chip forming tool cutting edges in said direction of movement and said drum having a second series of chip-receiving passages extending therethrough and each having a mouth disposed on the surface of said drum immediately in advance of said slabbing knife cutting edge in said direction of movement.

4. A chip-forming tool for producing wood chips comprising a body having a forward end face, a rearward end, a top face, and a bottom face, said forward end face having a line of juncture with said bottom face constituting a cutting edge, said cutting edge being continuous from end to end thereof and disposed substantially in a single plane and having a first straight portion and a second straight portion extending from one end of said first portion in angular and rearward relation thereto, the included angle between said second portion and said first portion being 165° to 135°, said bottom face being disposed at an angle of 30° to 60° to said plane on the rearward side of said cutting edge portions toward which said rearward angular portion extends, and said forward end face being disposed at an angle of 100° to 70° to said plane on said one side of said cutting edge portions.

References Cited by the Examiner

UNITED STATES PATENTS

| | | | |
|---|---|---|---|
| 1,776,180 | 9/1930 | Cobb | 144—218 |
| 2,796,094 | 6/1957 | Himmelheber et al. | 144—180 |
| 2,813,557 | 11/1957 | Thompson | 144—172 |
| 2,884,031 | 4/1959 | Standal | 144—218 |
| 3,011,535 | 12/1961 | Andrus et al. | 144—176 |

FOREIGN PATENTS 183,511  7/1922  Great Britain.

ROBERT C. RIORDON, *Primary Examiner.*

WILLIAM W. DYER, JR., LESTER M. SWINGLE,
*Examiners.*